United States Patent
Gubbi et al.

(10) Patent No.: US 6,754,176 B1
(45) Date of Patent: Jun. 22, 2004

(54) SCHEME FOR MANAGING OVERLAPPING WIRELESS COMPUTER NETWORKS

(75) Inventors: Rajugopal R. Gubbi, Fair Oaks, CA (US); Amar Ghori, El Dorado Hills, CA (US); Gregory H. Parks, Folsom, CA (US)

(73) Assignee: ShareWave, Inc., Austin, TX (US)

( * ) Notice: Subject to any disclaimer, the term of this patent is extended or adjusted under 35 U.S.C. 154(b) by 0 days.

(21) Appl. No.: 09/614,395

(22) Filed: Jul. 12, 2000

Related U.S. Application Data

(60) Provisional application No. 60/186,027, filed on Mar. 1, 2000.

(51) Int. Cl.[7] .............................................. G01R 31/08
(52) U.S. Cl. ...................................... 370/230; 370/329
(58) Field of Search ................................ 370/230, 235, 370/328, 239, 431, 442, 445, 447, 461, 462, 322, 329, 443; 455/443, 434, 453

(56) References Cited

U.S. PATENT DOCUMENTS

| | | | | |
|---|---|---|---|---|
| 5,654,959 A | * | 8/1997 | Baker ........................ | 370/331 |
| 6,188,681 B1 | * | 2/2001 | Vesuna ...................... | 370/338 |
| 6,226,277 B1 | * | 5/2001 | Chuah ....................... | 370/328 |
| 6,243,772 B1 | * | 6/2001 | Ghori ........................ | 710/68 |
| 6,285,662 B1 | * | 9/2001 | Watanabe ................... | 370/280 |

FOREIGN PATENT DOCUMENTS

| EP | 0 483 544 A1 | 5/1992 |
|---|---|---|
| WO | WO 01/43371 A2 | 6/2001 |

OTHER PUBLICATIONS

Haartsen J: "Bluetooth—The Universal Radio Interface for AD Hoc, Wireless Connectivity" 1998, On—Ericsson Review, Ericson. Stockholm, SE, NR. 3, page(s) 110–117, XP000783249.

Bhagwat et al: "A routing vector method (RVM) for routing in Bluetooth scatternets", Mobile Multimedia Communications, 1999. (MOMUC '99) 1999 IEEE International Workshop on San Diego, CA, USA Nov. 15–17, 1999, Piscataway, NJ, USA, IEEE, US, page(s) 375–379 XP01030736.

* cited by examiner

*Primary Examiner*—Douglas Olms
*Assistant Examiner*—Ricardo M. Pizarro
(74) *Attorney, Agent, or Firm*—James J. Murphy; Winstead Sechrest & Minick P.C.

(57) ABSTRACT

A scheme for sharing a channel during a contention free period of communications between two or more basic service sets (BSSs) including network components in an overlapping region of a wireless computer network. These network components in the overlapping region may be configured to communicate in contention free periods only. Such bandwidth sharing may then include transmitting within each BSS exclusively during an allocated period of time. Each BSS may include one point coordinator network component and all other network components in the BSS then inform the point coordinator of channel conditions including degradation, and the number of packets received from other BSSs.

11 Claims, 3 Drawing Sheets

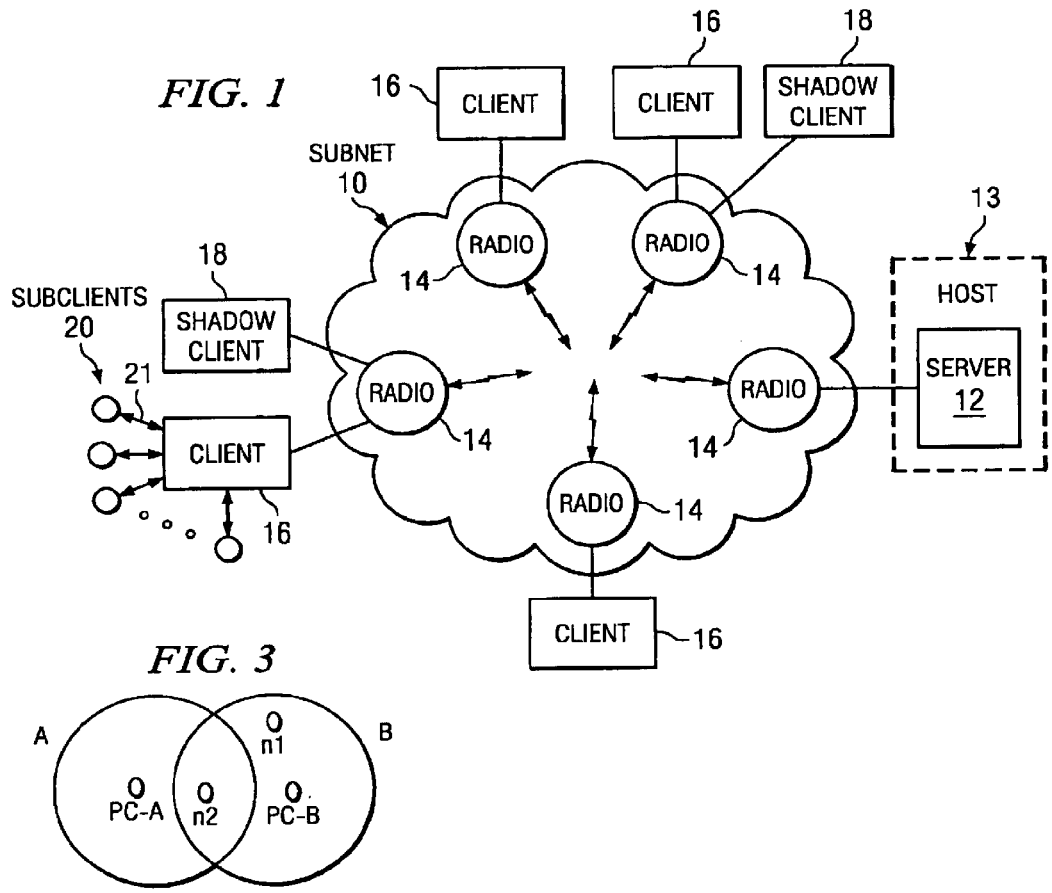
FIG. 1
FIG. 3
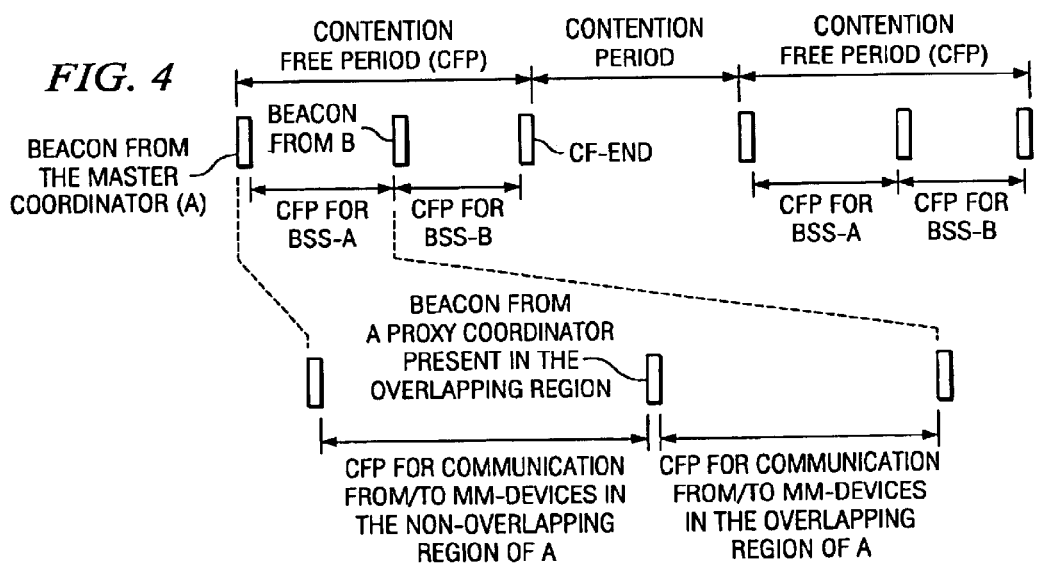
FIG. 4

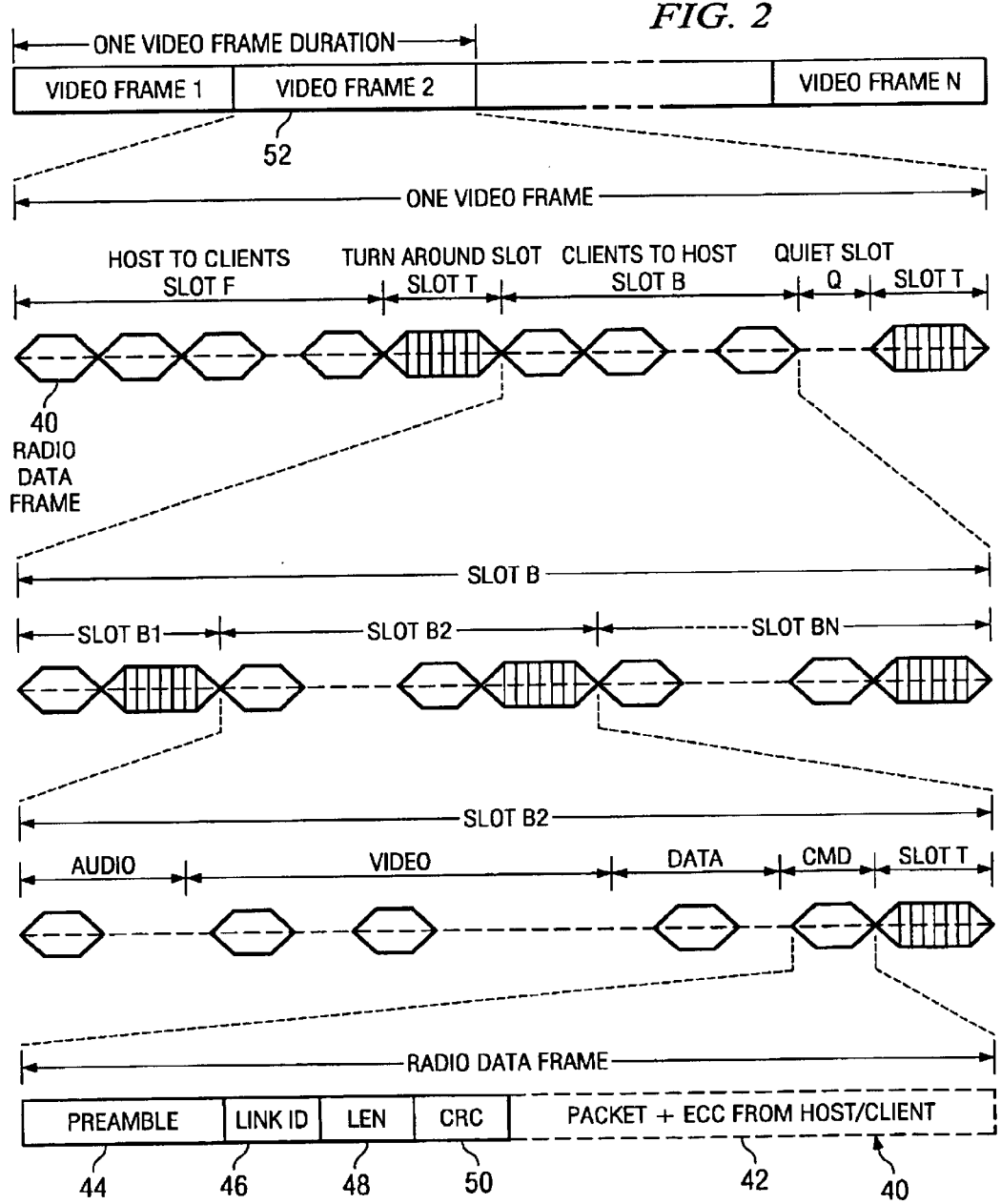

SCHEME FOR MANAGING OVERLAPPING WIRELESS COMPUTER NETWORKS

RELATED APPLICATION

The present application is related to and hereby claims the priority benefit of U.S. Provisional Application No. 60/186,027, filed Mar. 1, 2000, by Rajogopal R. Gubbi and Amar Ghori, entitled "Scheme for Managing Overlapping Wireless Computer Networks".

FIELD OF THE INVENTION

The present invention relates to a scheme for managing transmission collisions among overlapping wireless computer networks.

BACKGROUND

Modern computer networks allow for intercommunication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Furthermore, interference from existing appliances, such as televisions, cellular telephones, wireless telephones and the like may be experienced. Thus, analog wireless communication links offer less than optimum performance for a home environment.

In co-pending application, Ser. No. 09/151,579, which is incorporated herein by reference, a computer network employing a digital, wireless communication link adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used.

The generalization of this network structure is shown in FIG. 1. A subnet 10 includes a server 12. In this scheme, the term "subnet" is used to describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infra-red links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. The ECC bits may be used to simplify the detection of the beginning and ending of data packets at the receive side. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/ reception), lossless data (i.e., data that is encoded/decoded using lossless techniques or that cannot tolerate the loss of any packets during transmission/ reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/ reduce the number of ECC bits to cope with the new channel conditions. Hence, depending on whether the information rate at the source is altered, it may require a dynamic change to the forward and backward bandwidth allocation.

Another scheme for communicatively coupling components of a computer network is described in a standards document promulgated by the Institute of Electrical and Electronic Engineers (IEEE), entitled "Information technology—Telecommunications and information exchange between systems—Local and metropolitan area networks", currently in forms IEEE 802.11-1997 and an approved draft IEEE 802.11-1999. One drawback of this scheme, however, is that it overlapping computer networks may encounter colliding transmissions.

SUMMARY OF THE INVENTION

In one embodiment, a scheme for sharing a channel during a contention free period of communications between two or more basic service sets (BSSs) including network components in an overlapping region of a wireless computer network is provided. These network components in the overlapping region may be configured to communicate in contention free periods only. Such bandwidth sharing may then include transmitting within each BSS exclusively during an allocated period of time. Each BSS may include one point coordinator network component and all other network components in the BSS then inform the point coordinator of channel conditions including degradation, and the number of packets received from other BSSs.

The point coordinators of the BSSs negotiate an exclusive period of time for communicating with network components associated with their respective BSS. Where at least one network component is within transmission range of at least two such point coordinators that network component may operate as a proxy point coordinator between said two point coordinators. The proxy point coordinator transmits a proxy beacon to indicate the beginning of contention free communications of network components in the overlapping region.

In some embodiments then, one BSS may includes a first point coordinator; a second BSS may include a second point coordinator not within transmission range of the first point coordinator. A first network component in an overlapping region may be within transmission range of the first point coordinator but not within transmission range of said second point coordinator, while a second network component in the overlapping region may be within transmission range of the first network component and the second point coordinator but not within transmission range of the first point coordinator. In such cases, the first point coordinator negotiates with the second point coordinator for channel sharing by communicating through the first network component and the second network component, which act as proxy point coordinators, and as such may transmit a proxy beacon to indicate the beginning of contention free communications of other network components associated with their respective BSSs within the overlapping region.

Another embodiment provides an interface that includes means for sharing a channel during a contention free period of communications between two or more BSSs including network components in an overlapping region of a wireless computer network.

Further, a system that includes such an interface that enables it to communicate in an overlapping region of wireless computer network sharing a channel between two or more basic service sets during a contention free period of communications may be provided.

BRIEF DESCRIPTION OF THE DRAWINGS

The present invention is illustrated by way of example, and not limitation, in the figures of the accompanying drawings in which:

FIG. 1 illustrates a generalized network structure that is supported by a wireless communication protocol configured in accordance with an embodiment of the present invention;

FIG. 2 illustrates a hierarchical arrangement for the transmission of data and control information within a subnet according to one embodiment of the present invention;

FIG. 3 illustrates a pair of point coordinators operating with an overlapping region between them;

FIG. 4 illustrates the use of grouped contention free periods according to one embodiment of the present invention.

DETAILED DESCRIPTION

Figure 5:
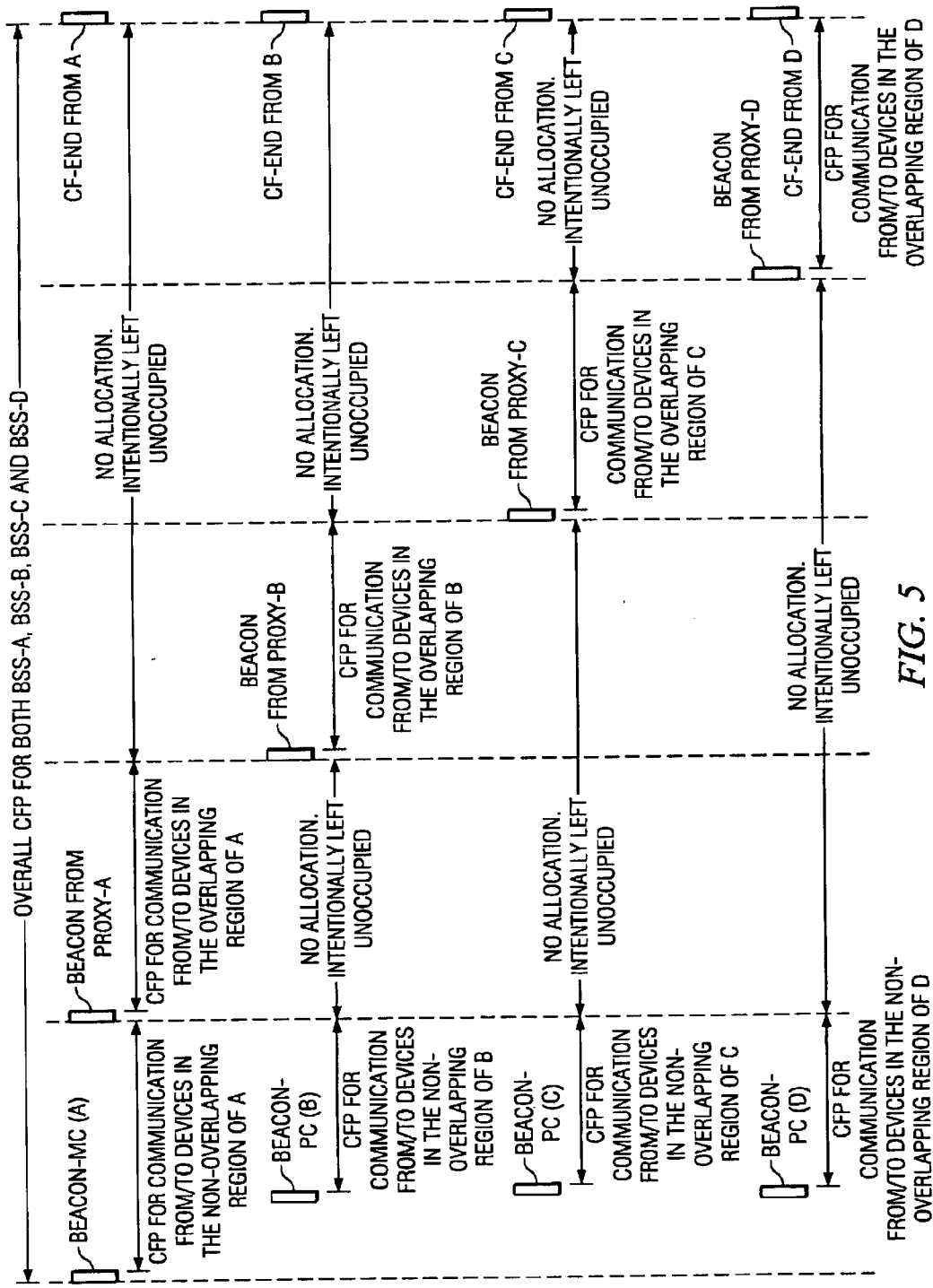
FIG. 5 illustrates a further example of grouped contention free periods in accordance with one embodiment of the present invention.

A scheme for sharing a channel during a contention free period of communications between two or more basic service sets (BSSs) including network components in an overlapping region of a wireless computer network is described herein. Although discussed with reference to certain exemplary embodiments, the present invention should not be limited this description. Instead, these examples are provided to help the reader understand the broader spirit and scope of the invention as set forth in the claims that follow this discussion.

The above-described network components in the overlapping region may be configured to communicate in contention free periods of network operations. Such bandwidth sharing may then include transmitting within each BSS exclusively during an allocated period of time. Each BSS may include one point coordinator network component and all other network components in the BSS then inform the point coordinator of channel conditions including degradation, and the number of packets received from other BSSs.

The point coordinators (PCs) of the BSSs negotiate an exclusive period of time for communicating with network components associated with their respective BSS. Where at least one network component is within transmission range of at least two such point coordinators that network component may operate as a proxy point coordinator between said two point coordinators. The proxy point coordinator transmits a proxy beacon to indicate the beginning of contention free communications of network components in the overlapping region.

In some embodiments then, one BSS may includes a first point coordinator; a second BSS may include a second point coordinator not within transmission range of the first point coordinator. A first network component in an overlapping region may be within transmission range of the first point coordinator but not within transmission range of said second point coordinator, while a second network component in the overlapping region may be within transmission range of the first network component and the second point coordinator but not within transmission range of the first point coordinator. In such cases, the first point coordinator negotiates with the second point coordinator for channel sharing by communicating through the first network component and the second network component, which act as proxy point coordinators, and as such may transmit a proxy beacon to indicate the beginning of contention free communications of other network components associated with their respective BSSs within the overlapping region.

Another embodiment provides an interface (e.g., as embodied on a network interface card for a computer as is common in the art) that includes means for sharing a channel during a contention free period of communications between two or more BSSs including network components in an overlapping region of a wireless computer network.

Further, a system (e.g., a server or other computer system) that includes such an interface that enables it to communicate in an overlapping region of wireless computer network sharing a channel between two or more basic service sets during a contention free period of communications may be provided.

An 802.11 wireless LAN (WLAN) provides support for device connection and authentication, and allows for transportation of asynchronous data over a wireless channel. WLANs are configured with so-called Point Coordinator Functions (PCFs) to support data transfers and the operation of PCFs as defined in the current 802.11 standard provides for various contention free periods (CFP) during network operations. However as PCF was mainly designed to transfer low rate voice over the WLAN, it has several drawbacks when used to transport multimedia data over the WLAN.

For example, PCF does not guarantee the availability of the beacon period itself as a DCF-only station can manage to occupy the channel and delay the beacons arbitrarily. These delays can be as large as the maximum size of the data frame that is supported in the standard. Additionally, point coordinators (PCs) use a DIFS plus a random back-off delay to start a CFP when the initial beacon is delayed because of deferral due to a busy medium. This further complicates the problem of providing a periodic opportunity for MMSs for their data transmission.

Further, PCF is an AP-centric data transfer method and it does not provide peer-to-peer data transfers during the CFP. In a multimedia WLAN, this kind of star topology adds unacceptable latencies and unnecessarily increases the burden on network efficiency as the AP has to behave like data repeater between the two stations wishing to exchange data during CFP.

There is also a risk of repeated collisions if multiple, overlapping, PCs operate in the same PHY channel, which can cause repeated collisions. There is further added the complication of the PC being required to lose control of the medium for a random number of slot times periodically. As the home market increases and the wireless stations are used by apartment dwellers, the throughput reduction due to this problem becomes unacceptable for the user.

In addition to the above, two sets of devices belonging to the same user can form two BSSs (Basic Service Sets) each with a PC. This causes an unnecessary increase in beacon traffic and exacerbates other problems due to collisions. Further, there is no support for the Quality of Service (QoS) that is essential in supporting the multimedia data traffic over WLAN.

If the operating PHY medium gets too noisy, there is no defined mechanism for the PC to look for a better channel and move the network operations to this new channel. This is extremely important when a multimedia data is being transported over an inherently noise prone WLAN medium.

When a PC is polling for an asynchronous data stream and a multimedia data stream, like audio/video, there are no defined ways for a station streaming multimedia to get priority in channel usage. This can cause problems such as dropped video frames or audio clicks simply because of competition for bandwidth. Nor is there any defined mechanism for a station with larger data rate to get priority over a station with a smaller data rate when both the data streams are of equal importance. A good example of this in the home environment is when one station is streaming audio to the speakers in the kitchen while another station is streaming audio-video (AV), for example a DVD movie, to a television.

To overcome some of the above drawbacks, the present scheme provides an organized, coordinated mechanism for bandwidth sharing through negotiations by point coordinators (PCs). These negotiations are independent of movement of devices into and out of overlapping communication regions and are scalable between home and enterprise environments. The scheme has low complexity in that the negotiations are demand-based and occur only during connection setup periods and at any major change in stream requirements.

In the present scheme, CFP sharing is used for devices in an overlapped region (see FIG. 3, where node n2 is in an overlapped region between PC-A and PC-B), thus allowing bandwidth reuse by DFC devices (e.g., node n1) in non-overlapping regions. Referring to FIG. 3, the two PCs (PC-A and PC-B) negotiate the CPF sharing and indicate/reserve a portion within their (individual) CFPs for communication from/to their devices in the overlapping region. A beacon from a master coordinator (MC) is used as the primary time reference for this purpose. The reserved portion within a CFP for devices in a non-overlapped region can then be used by the DCF devices in the non-overlapping region of the other PC (and vice-versa). That is, the reserved portion of PC-A's CFP for its devices in the non-overlapping region can be used by the DCF devices in the non-overlapping region of PC-B (and vice-versa).

FIG. 4 illustrates this segregation of CFPs. Notice that within the CFP for BSS-A (which originates after the beacon from the MC-A), a CFP for communication from/to multimedia (MM) devices in the non-overlapping region is provided. This is followed by a beacon from a proxy coordinator (e.g., a network node that acts to pass messages between a PC and a client which cannot receive transmissions directly from the PC) and a similar CFP for communications from/to MM devices in the overlapping region of A. Similar CFPs may exist for all PCs, followed by a contention period, and so on.

As shown in FIG. 5, this scheme may be extended to accommodate multiple PCs and multiple overlapping regions among the PCs. In each case, a CFP for communication from/to devices in a non-overlapping region is followed by a CFP for communication from/to devices in an overlapping region. Grouping CFPs into overlapped and non-overlapped regions in this fashion can thus be extended to any number of BBSs. Bandwidth sharing is fully controlled and the DCF devices are free to reuse bandwidth in the non-overlapping regions. A PC may prefer to implement the simplest version of requiring all its CFP as in overlapped region comprising the reuse of bandwidth in its BBS. Further, as shown in FIG. 5, there may be occasions where bandwidth is intentionally left unused, e.g., to accommodate future needs.

Thus, a scheme for managing overlapping wireless computer networks has been described. It should be understood that the grouping of the contention free periods may be achieved by using machine-readable commands (e.g., stored on machine-readable media in the conventional fashion), which when executed by a computer or similar processor cause the computer to act accordingly to implement the desired functionality. Further, the examples presented above are used merely for illustrative purposes and should not be read as limiting the broader spirit and scope of the present invention as defined in the claims that follow.

What is claimed is:

1. A method comprising sharing a channel during a contention free period of communication between two or more basic service sets including network components in an overlapping region of a wireless computer network wherein:

a first basic service set includes a first point coordinator;

a second basic service set includes a second point coordinator not within transmission range of said first point coordinator;

a first other network component in said overlapping region is within transmission range of said first point coordinator but not within transmission range of said second point coordinator;

a second other network component in said overlapping region is within transmission range of said first other network component and said second point coordinator but not within transmission range of said first point coordinator;

said first point coordinator negotiates with said second point coordinator the channel sharing by communicating through said first network component and said second network component acting as proxy point coordinators; and the network components in the overlapping region communicate in contention free periods only.

2. The method of claim 1 wherein all other network components in a basic service set inform their corresponding point coordinator of channel conditions including degradation and number of packets received from other basic service sets.

3. The method of claim 2 wherein the point coordinators negotiate an exclusive period of time for communicating with the network components in the overlapping region associated with their basic service sets.

4. The method of claim 1 wherein at least one network component is within transmission range of the first and second point coordinators.

5. A method of communication between first and second basic service sets in a wireless network wherein each basic service set includes a point coordinator and wherein each of said point coordinators cannot directly communicate with each other, the wireless network including a network component in a region of overlap between two or more point coordinators, and a distributed coordination function device in a region of non-overlap, the method comprising:

sharing a channel during a contention free period of communication wherein the network component in the overlapping region communicates in contention free periods only, and wherein said network component in the region of overlap operates as a proxy point coordinator between said two or more point coordinators, such that the distributed coordination function device can utilize bandwidth reuse within the region of non-overlap between the point coordinators.

6. The method of claim 5 wherein said proxy point coordinator transmits a proxy beacon to indicate the beginning of contention free communications of network components in the overlapping region.

7. The method of claim 1 wherein said proxy point coordinators transmit a proxy beacon to indicate the beginning of contention free communications of other network components associated with their basic service set within the overlapping region.

8. The method of claim 1 wherein the first and second basic service sets include one or more other network components outside said overlapping region each communicating with the point coordinator associated to their basic service set at the same time that such other network component in the other basic service set communicates with the point coordinator associated with such other basic service set simultaneously using the same channel during the contention free period.

9. A method of coordinating communication in a wireless network including first and second point coordinators having overlapping areas of wireless coverage, and including at least one network device in the overlapping area of coverage, the method comprising:

providing a first contention free period during which the first and second point coordinators communicate with network devices in their area of coverage excluding the at least one network device in the overlapping area of coverage; and providing a second contention free period during which the at least one network device in the overlapping are of coverage communicates with the first and second point coordinator.

10. The method of claim 9, wherein there are at least two network devices in the overlapping area of coverage and wherein the at least two network devices communicate with the first and second point coordinators during corresponding portions of the second contortion free period.

11. The method of claim 5, wherein two or more networks components are in the region of overlap, the method further comprising coordinating the two or more network components so that only one transmits at a time.

\* \* \* \* \*